United States Patent
Tatsuhiro (10) Patent No.: US 11,256,233 B2
(45) Date of Patent: Feb. 22, 2022

(54) NUMERICAL CONTROLLER

(71) Applicant: Fanuc Corporation, Yamanashi (JP)

(72) Inventor: Yamada Tatsuhiro, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 17/007,631

(22) Filed: Aug. 31, 2020

(65) Prior Publication Data

US 2021/0089006 A1 Mar. 25, 2021

(30) Foreign Application Priority Data

Sep. 25, 2019 (JP) .............................. JP2019-174275

(51) Int. Cl.
*G05B 19/4155* (2006.01)
*G05B 19/404* (2006.01)

(52) U.S. Cl.
CPC ....... *G05B 19/4155* (2013.01); *G05B 19/404* (2013.01)

(58) Field of Classification Search
None
See application file for complete search history.

(56) References Cited

U.S. PATENT DOCUMENTS

| | | | | |
|---|---|---|---|---|
| 4,442,493 A | * | 4/1984 | Wakai | G01N 3/58 408/11 |
| 4,980,627 A | * | 12/1990 | Joboji | G05B 19/4067 318/570 |
| 2018/0059636 A1 | * | 3/2018 | Fukumoto | G05B 19/19 |
| 2020/0133236 A1 | * | 4/2020 | Tango | G05B 19/4155 |

FOREIGN PATENT DOCUMENTS

JP 1115513 A 1/1999

* cited by examiner

*Primary Examiner* — Ryan A Jarrett
(74) *Attorney, Agent, or Firm* — RatnerPrestia (57) ABSTRACT

A numerical controller includes a look-ahead unit configured to look ahead a block in the program into a buffer, a remaining block determination unit configured to determine whether retraction of a tool is needed or return of the tool is needed based on an amount of the block looked ahead in the buffer, a tool operation control unit configured to control retraction and return of the tool when the remaining block determination unit determines that retraction of the tool is needed, a block division unit configured to divide a block to divide at a position apart from both ends of the block according to a command from the tool operation control unit, and a tool path generation unit configured to generate a tool retraction path and a tool return path and insert the generated paths into a divided position in the block divided by the block division unit.

6 Claims, 9 Drawing Sheets

EXAMPLE:
CONFIGURATION OF 3-AXIS MACHINE

EXAMPLE:
CONFIGURATION OF 5-AXIS MACHINE

NUMERICAL CONTROLLER

RELATED APPLICATIONS

The present application claims priority to Japanese Patent Application Number 2019-174275 filed Sep. 25, 2019, the disclosure of which is hereby incorporated by reference herein in its entirety.

BACKGROUND OF THE INVENTION

Field of the Invention

The present invention relates to a numerical controller, and more particularly relates to a numerical controller that automatically retracts and returns a tool.

Description of the Related Art

Numerical controllers read machining programs and execute machining programs to automatically operate. The machining programs executed by the numerical controllers were manually created in the past, but nowadays CAD/CAM systems can create free-form surfaces interpolated with minute line segments. The machining programs created by CAD/CAM systems are composed of more blocks than those manually created, so that having a larger size.

For execution of a larger size machining program, reading the entire machining program into an internal memory of the numerical controller at once requires implementing an internal memory with a larger capacity in the numerical controller. However, the larger capacity the internal memory of the numerical controller has, the higher cost of itself the numerical controller has. Thus, for execution of the larger size machining program, cost reduction is achieved by a method in which the machining program is stored in an external storage device connected to the numerical controller and then the machining program is read in a sequential manner from the external storage device to be executed. The external storage devices connected to the numerical controller include SD cards, CF cards, USB memories and servers connected via an Ethernet®.

Reading the machining program from the external storage device leads to a longer transfer time than from the internal memory and an unstable transfer speed. For example, for use of a server connected via the Ethernet® as the external storage device, disconnection of the Ethernet® results in a wait state for a transfer of the machining program. Then, in the wait state for the transfer of the machining program during cutting, a next block cannot be executed. This stops a tool in a state in which the tool is in contact with a workpiece, thereby causing possible damage on a machining surface of the workpiece.

The numerical controllers commonly have look-ahead functions that look ahead the machining programs to analyze them. For control of a machine tool by using the look-ahead function, the numerical controller looks ahead the blocks in the machining program to buffer the blocks in a buffer, controlling the machine tool according to the buffered blocks. Blocks already executed and used for control are deleted from the buffer at this time. A technology is known that slows down a cutting speed when all blocks of the machining program being buffered are about to be removed from the buffer due to a slower look-ahead speed than a machining speed. However, slowing down the cutting speed by using the technology is sometimes insufficient for further buffering, so that the tool may have to be retracted. Further, a common technology is known that retracts the tool from the machining surface but takes no account of restarting after retracting.

Japanese Patent Laid-Open No. 11-015513 discloses a technology in which when a data amount of a tool path looked ahead and buffered is equal to or less than a predetermined amount, a tool is retracted in such a manner as to draw a tangent path relative to the tool path, and when the data amount is equal to or more than the predetermined amount, the tool is returned in such a manner as to draw a tangent path relative to the tool path to restart cutting machining.

Figure 8:
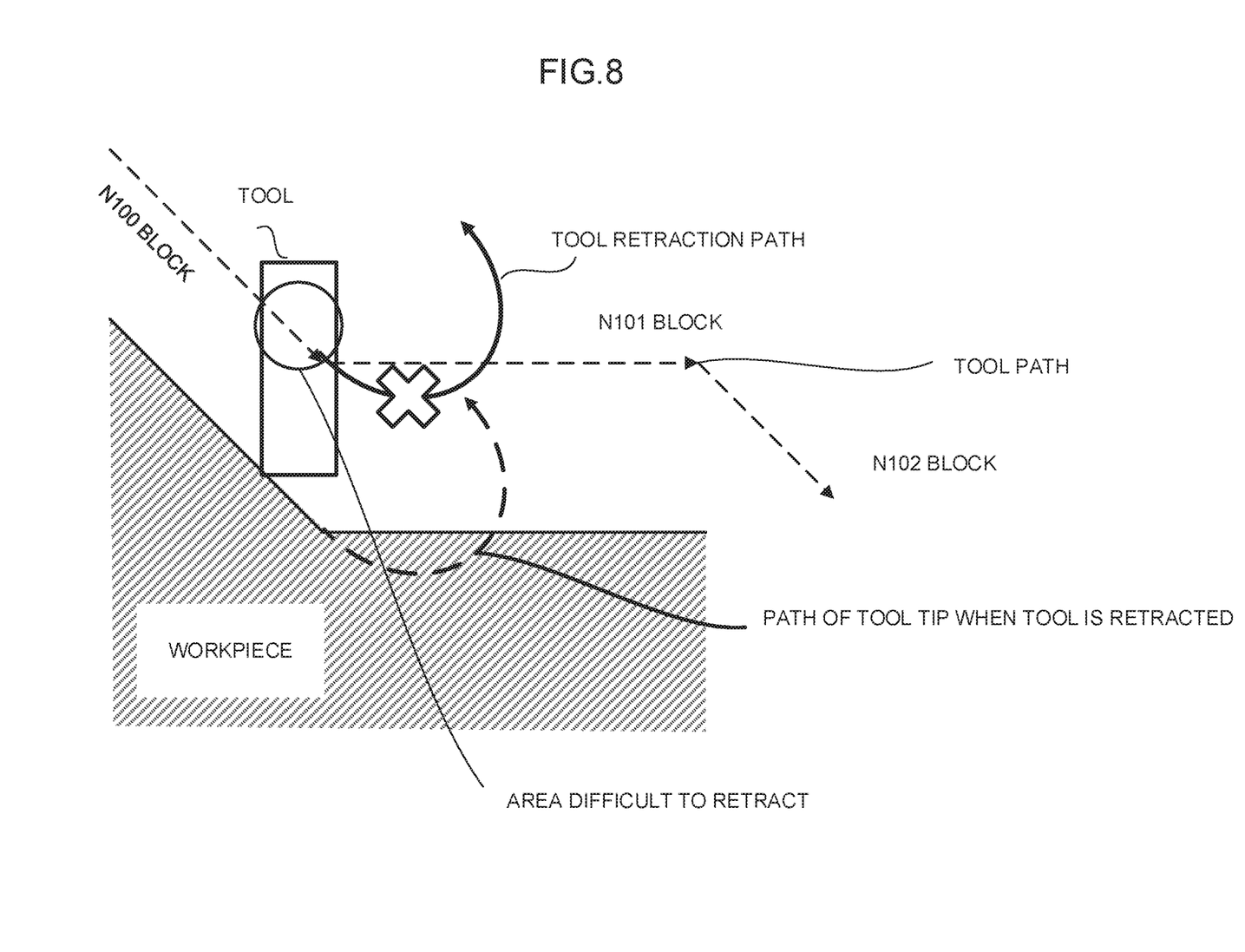
FIG. 8 is a diagram illustrating an example of an interference between a tool and a workpiece during tool retraction.
Figure 9:
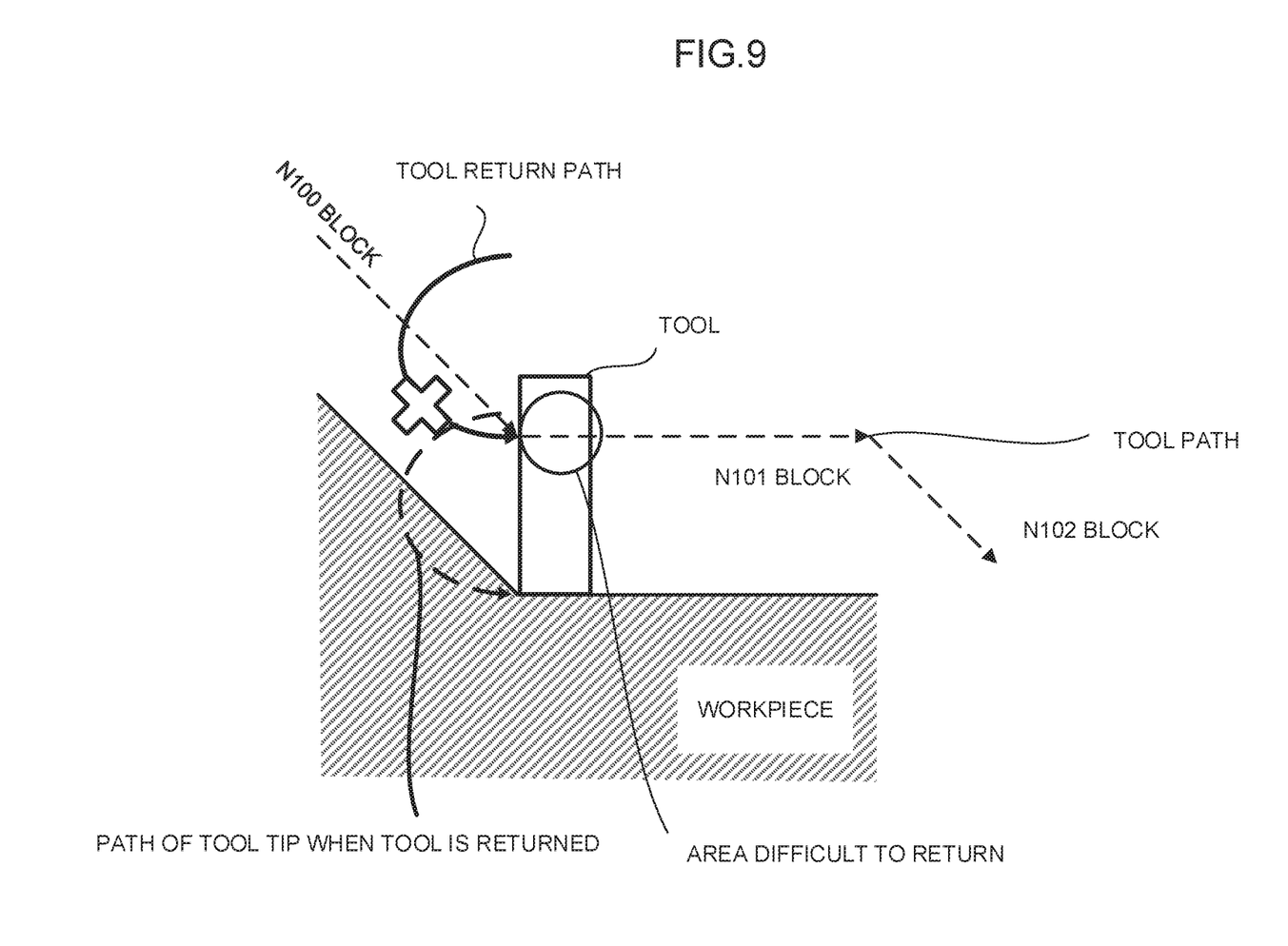
FIG. 9 is a diagram illustrating an example of an interference between a tool and a workpiece during tool return.

When a timing at which the buffered data is equal to or less the predetermined amount is, for example, near a point at which a speed vector changes in machining of an inner side of a workpiece, there is a possibility for the tool to interfere with the workpiece during retraction and return of the tool. FIG. 8 shows a situation in which the tool is retracted at a machining position in the inner side of the workpiece and FIG. 9 shows another situation in which the tool is returned at a machining position in the inner side of the workpiece. For example, consider a case illustrated in FIG. 8 where a concave shape is machined in the workpiece by using feed commands for feeding the tool along two consecutive straight-line segments of an N100 block and an N101 block. In this case, when the N101 block fails to be buffered during machining according to commands commanded by the N100 block due to a delay of reading from the external storage device, the tool is retracted from a machining surface in a direction of a tangent of the N100 block upon an end of the commands commanded by the N100 block so as not to stop the tool on the machining surface, thereby a tool tip can be fed into a workpiece side from a machining path commanded by the N101 block, this causing possible damage on a surface of the workpiece.

This phenomenon can also occur when the retracted tool is returned. For example, consider a case where an N102 block fails to be buffered. As illustrated in FIG. 9, when the tool is retracted from the machining surface at a start of the N101 block and then the tool is returned in a direction of a tangent of the N101 block when the N102 block is buffered, the tool tip can be fed into the workpiece side from a machining path commanded by the N100 block, thereby causing possible damage on the surface of the workpiece.

SUMMARY OF THE INVENTION

To prevent such phenomena, a technology is required that enables retraction and return of a tool with minimizing a possibility for a tool retraction path and a tool return path to interfere with a machining path.

A numerical controller according to an embodiment of the present invention solves the above problems by automatically calculating a retracting direction while executing a block and retracting the tool when determining a need for the tool to be retracted, then returning the tool when determining return of the tool.

The numerical controller according to the embodiment of the present invention controls a relative position between the tool of a machine tool and a workpiece to machine the workpiece according to a block in a program. The numerical controller includes: a tool operation control unit configured to control retraction and return of the tool when retraction of the tool is needed; a block division unit configured to divide a block to divide at a position apart from both ends of the block according to a command from the tool operation control unit; and a tool path generation unit configured to generate the tool retraction path and the tool return path and insert the generated paths into a divided position in the block divided by the block division unit.

According to the embodiment of the present invention, retracting the tool within a block enables retraction and return of the tool with minimizing a possibility for the tool retraction path and the tool return path to interfere with a machining path.

BRIEF DESCRIPTION OF THE DRAWINGS

The above mentioned and other objects and features of the present invention are apparent from the following description of embodiments with the accompanying drawings, in which.

DETAILED DESCRIPTION OF THE PREFERRED EMBODIMENTS

An embodiment of the present invention will be described below with reference to the drawings.

Figure 1:
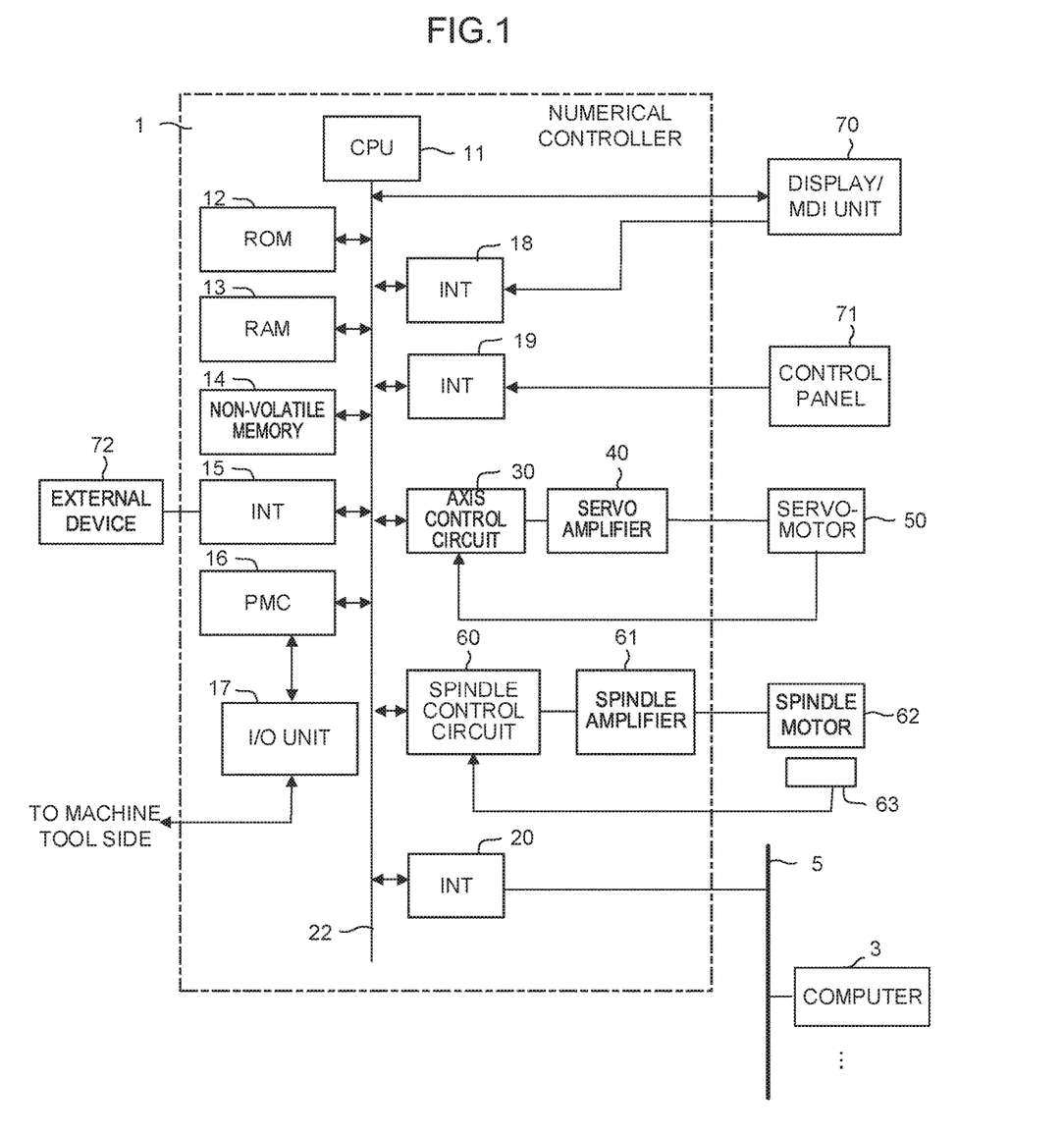
FIG. 1 is a schematic hardware configuration diagram of a numerical controller according to an embodiment of the present invention.

FIG. 1 is a schematic hardware configuration diagram of principal parts of a numerical controller according to an embodiment of the present invention. A numerical controller 1 of the present invention, for example, can be implemented as a numerical controller that controls a machine tool according to a machining program.

A CPU 11 of the numerical controller 1 according to the present embodiment is a processor that controls the entire numerical controller 1. The CPU 11 reads out a system program stored in a ROM 12 via a bus 22, controlling the entire numerical controller 1 according to the system program. A RAM 13 temporarily stores temporary calculation data, display data, various data inputted externally, and the like.

A non-volatile memory 14 is configured with, for example, a memory with a battery backup (not shown), a solid-state drive (SSD), and the like, keeping its storage capability during power-down of the numerical controller 1. The non-volatile memory 14 stores a parameter read from an external device 72 via an interface 15, a parameter inputted via a display/MDI unit 70, and the like. Parameters and various data stored in the non-volatile memory 14 may be read out into a RAM 13 at the time of execution or use.

Further, various system programs such as a well-known analysis program is previously written in the ROM 12.

An interface 15 connects the CPU 11 of the numerical controller 1 with the external device 72 such as a USB device. The external device 72 reads the machining program used for controlling the machine tool, various parameters, and the like into the numerical controller 1. Furthermore, programs edited in the numerical controller 1, various parameters, and the like can be stored in an external storage means via the external device 72. A programmable machine controller (PMC) 16, according to a sequence program stored in the numerical controller 1, outputs a signal to the machine tool and a peripheral device of the machine tool (e.g., a tool change device, an actuator such as a robot, and a sensor mounted to the machine tool) via an I/O unit 17 to control the machine tool and the peripheral device. Furthermore, the PMC 16 receives signals from various switches on a control panel mounted to a body of the machine tool, the peripheral device, and the like, performing required signal processing on the signal, then sending the resultant signal to the CPU 11.

An interface 20 connects the CPU of the numerical controller 1 and a wired or wireless network 5. The network 5 is connected with at least one computer 3 and the computer 3 exchanges data with the numerical controller 1. The computer 3 may be other control device, a server that stores a machining program, a fog computer, a cloud server, and the like.

A display/MDI unit 70 is a manual data input device provided with a display, a keyboard, and the like. An interface 18 receives a command and data from the keyboard of the display/MDI unit 70 to output them to the CPU 11. An interface 19 is connected to a control panel 71 including a manual pulse generator used for manually driving individual axes.

An axis control circuit 30 for controlling an axis of the machine tool receives a movement command amount for the axis from the CPU 11, outputting a command for the axis to a servo amplifier 40. The servo amplifier 40 receives the command, driving a servomotor 50 that moves the axis of the machine tool. The servomotor 50 for the axis includes a position/speed detector and feeds back a position/speed feedback signal from the position/speed detector to the axis control circuit 30 to perform position and speed feedback control. Note that the hardware configuration diagram in FIG. 1 shows only one each of the axis control circuit 30, the servo amplifier 40, and the servomotor 50; however, a set of those is actually provided in the number of axes included in the machine tool to control. For example, for relatively moving the tool attached to a spindle and a workpiece by three linear axes to control a machine tool that machines a workpiece, three sets of the axis control circuits 30, the servo amplifiers 40, and the servomotors 50 for moving the spindle in x, y, and z axes directions are provided.

A spindle control circuit 60 receives a spindle rotation command, outputting a spindle speed signal to a spindle amplifier 61. On receiving the spindle speed signal, the spindle amplifier 61 rotates a spindle motor 62 of the machine tool at a commanded rotational speed to drive a tool. A position coder 63 is coupled to the spindle motor 62. The position coder 63 outputs a feedback pulse in synchronization with rotation of the spindle. The feedback pulse is read by the CPU 11.

Figure 2:
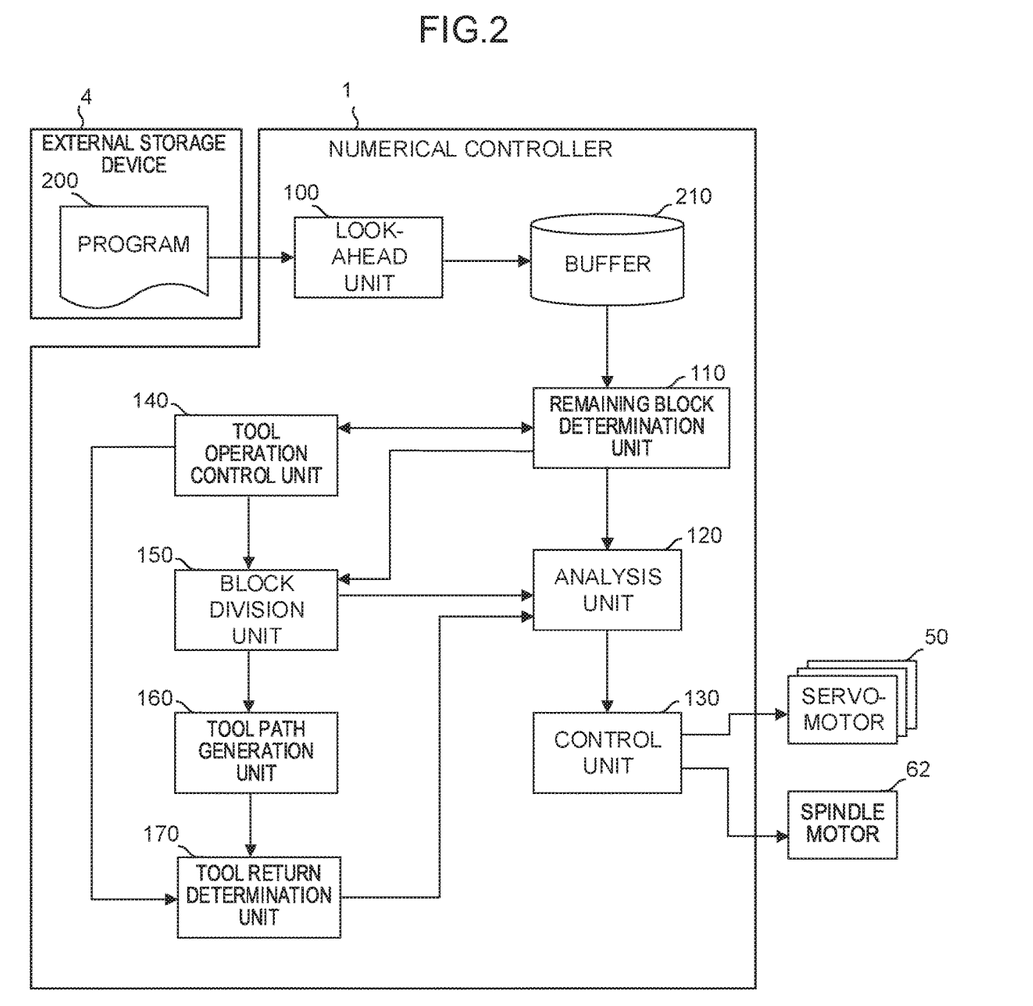
FIG. 2 is a schematic functional block diagram of a numerical controller according to a first embodiment.

FIG. 2 is a schematic functional block diagram of a numerical controller 1 according to the first embodiment of the present invention. Each functional block shown in FIG. 2 is implemented by the CPU 11 of the numerical controller 1 shown in FIG. 1 executing the system program and controlling operation of each part of the numerical controller 1. The numerical controller 1 according to the present embodiment controls the servomotor 50 to relatively move the tool attached to the spindle and a workpiece, thereby controlling the machine tool that machines the workpiece using the tool rotating by the spindle motor 62.

The numerical controller 1 according to the present embodiment includes a look-ahead unit 100, a remaining block determination unit 110, an analysis unit 120, a control unit 130, a tool operation control unit 140, a block division unit 150, a tool path generation unit 160, and a tool return determination unit 170. Moreover, for the RAM 13 or the non-volatile memory 14 of the numerical controller 1, a buffer 210 is previously allocated as an area for buffering blocks in a program 200 looked ahead from the external storage device 4.

In a look-ahead unit 100, the CPU 11 of the numerical controller 1 shown in FIG. 1 executes the system program read from the ROM 12. In addition, the look-ahead unit 100 performs arithmetic processing using the RAM 13 and the non-volatile memory 14 mainly by the CPU 11 and read processing by the interface 15 or the interface 20. The look-ahead unit 100 reads a block in the program 200 stored in the external storage device 4 and stores the block in the buffer 210. When the buffer 210 has a sufficient free space to store one or more block in the program 200, the look-ahead unit 100 reads a block in the program 200 from the external storage device 4 and stores the block in the buffer 210. If there is no particular problem, the look-ahead unit 100 looks ahead a block next to the block already looked ahead from the external storage device 4.

In the remaining block determination unit 110, the CPU 11 of the numerical controller 1 shown in FIG. 1 executes the system program read from the ROM 12. In addition, the remaining block determination unit 110 performs arithmetic processing using the RAM 13 and the non-volatile memory 14 mainly by the CPU 11. The remaining block determination unit 110 determines an amount of a remaining block in the buffer 210. Then, when determining that the amount of the remaining block is larger than a predetermined first threshold previously set or all the blocks in the program 200 is looked ahead into the buffer 210, the remaining block determination unit 110 reads the block from the buffer 210 and then outputs the block to the analysis unit 120.

Alternatively, when determining that the amount of the remaining block in the buffer 210 is equal to or less than the predetermined first threshold previously set, the remaining block determination unit 110 notifies the tool operation control unit 140 of the determination. The remaining block determination unit 110 then reads the block in the buffer 210 in response to a request from the block division unit 150 to output the block, then temporarily stopping reading the block from the buffer 210. The remaining block determination unit 110 monitors the amount of the remaining block in the buffer 210 while temporarily stopping reading the block. When determining that the amount of the remaining block looked ahead into the buffer 210 is equal to or more than a predetermined second threshold previously set, the remaining block determination unit 110 outputs the determination to the tool operation control unit 140 and restarts reading from the buffer.

In the analysis unit 120, the CPU 11 of the numerical controller 1 shown in FIG. 1 executes the system program read from the ROM 12. In addition, the analysis unit 120 performs arithmetic processing using the RAM 13 and the non-volatile memory 14 mainly by the CPU 11. The analysis unit 120 analyzes a block inputted from the remaining block determination unit 110, the block division unit 150, the tool return determination unit 170, and the like, generating movement command data for each servomotor and spindle command data that commands a rotational number of the spindle. The analysis unit 120 generates a movement command data for the servomotor 50 according to a feed command commanded by the block. Furthermore, the analysis unit 120 generates the spindle command data for the spindle motor 62 according to the spindle rotation command commanded by the block in the program 200.

In the control unit 130, the CPU 11 of the numerical controller 1 shown in FIG. 1 executes the system program read from the ROM 12. In addition, the control unit 130 performs arithmetic processing by the CPU 11 using the RAM 13 and the non-volatile memory 14, control processing for the servomotor 50 by the spindle control circuit 30 and the servo amplifier 40, and control processing for the spindle motor 62 by the spindle control circuit 60 and the spindle amplifier 61. The control unit 130 drives the servomotor 50 and the spindle motor 62 according to the movement command data and the spindle command data generated by the analysis unit 120.

In the tool operation control unit 140, the CPU 11 of the numerical controller 1 shown in FIG. 1 executes the system program read from the ROM 12. In addition, the tool operation control unit 140 performs arithmetic processing using the RAM 13 and the non-volatile memory 14 mainly by the CPU 11. When retraction of the tool is needed, the tool operation control unit 140 commands the block division unit 150 to divide a current block and retract the tool. Then, when return of the tool is possible, the tool operation control unit 140 commands the tool return determination unit 170 to return the tool from a state of the retraction. The tool operation control unit 140 may control retraction and return of the tool according to, for example, an input from the remaining block determination unit 110. Furthermore, the tool operation control unit 140 can also receive a notification from other than the remaining block determination unit 110. For example, when receiving a feed-hold signal, the tool operation control unit 140 may determine a need to immediately stop the tool and receive a current block from the remaining block determination unit 110, then commanding the block division unit 150 to retract the tool in the current block. At this time, the tool operation control unit 140 commands the remaining block determination unit 110 to temporary stop reading from the buffer 210 until receiving a machining restart signal.

In the block division unit 150, the CPU 11 of the numerical controller 1 shown in FIG. 1 executes the system program read from the ROM 12. In addition, the block division unit 150 is implemented mainly by the CPU 11 performing arithmetic processing using the RAM 13 and the non-volatile memory 14. The block division unit 150 receives the current block from the remaining block determination unit 110, dividing the block according to an input from the tool operation control unit 140. The block division unit 150 then outputs a first part of the divided block to the analysis unit 120, outputting a second part of the divided block to the tool path generation unit 160. The block division unit 150 may divide a designated block at a midpoint thereof in simplest implementation. Note that when a block to divide is for a non-cutting path, the block division unit 150 commands the tool path generation unit 160 not to generate a tool retraction path and a tool return path.

Furthermore, the block division unit 150, for example, may analyze a block to divide, dividing the block at any position spaced apart from both ends of the block by a distance calculated by multiplying a tool moving speed in the block by an acceleration/deceleration time constant. This can prevent the tool from departing from a path commanded by the block as much as possible when the tool is retracted or returned. The block division unit 150 divides the block at a position apart from a block start position by a distance apart from the calculated position by a predetermined margin, thereby being capable of minimizing a possibility for the tool retraction path to interfere with a machining path commanded by a subsequent block after the block. Note that, for no possible position apart from both ends of a block by a calculated distance due to a short block length, the block may be divided at a midpoint thereof as a dividing position.

Figure 3:
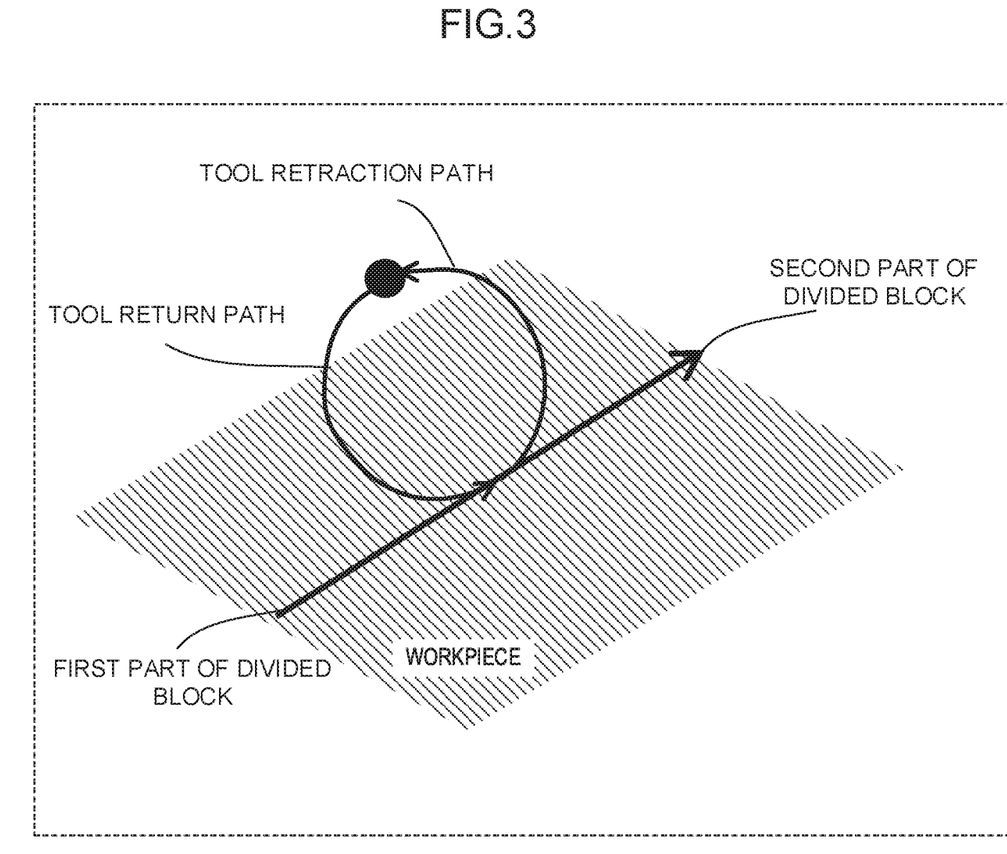
FIG. 3 is a diagram illustrating an example of an arc-shape tool retraction path and an arc-shape tool return path.

In the tool path generation unit 160, the CPU 11 of the numerical controller 1 shown in FIG. 1 executes the system program read from the ROM 12. In addition, the tool path generation unit 160 is implemented mainly by the CPU 11 performing arithmetic processing using the RAM 13 and the non-volatile memory 14. The tool path generation unit 160 generates a path inserted the tool retraction path and the tool return path into before the second part of the divided block inputted from the block division unit 150. The tool path generation unit 160 outputs the generated path to the tool return determination unit 170. The tool path generation unit 160, as shown in FIG. 3, may generate a tool retraction path and a tool return path each having an arc shape with a tangent of a divided path. Furthermore, the tool path generation unit 160 may generate a tool retraction path and a tool return path each having an oval shape, instead of an arc shape, with a tangent of a divided path. The tool path generation unit 160, as a further different shape, may generate a tool retraction path and a tool return path, which have an inverted-triangle shape and the like, along which a tool is retracted from the divided position of the block apart from a workpiece at a predetermined angle and is returned to the workpiece at a predetermined angle, respectively. The tool retraction path and the tool return path generated by the tool path generation unit 160 may be any path as long as the tool is retracted from a workpiece at a gentle angle and is returned to the workpiece at a gentle angle along respective paths so that cutter marks are less likely remain on the workpiece when the tool is retracted or returned.

Figure 4:
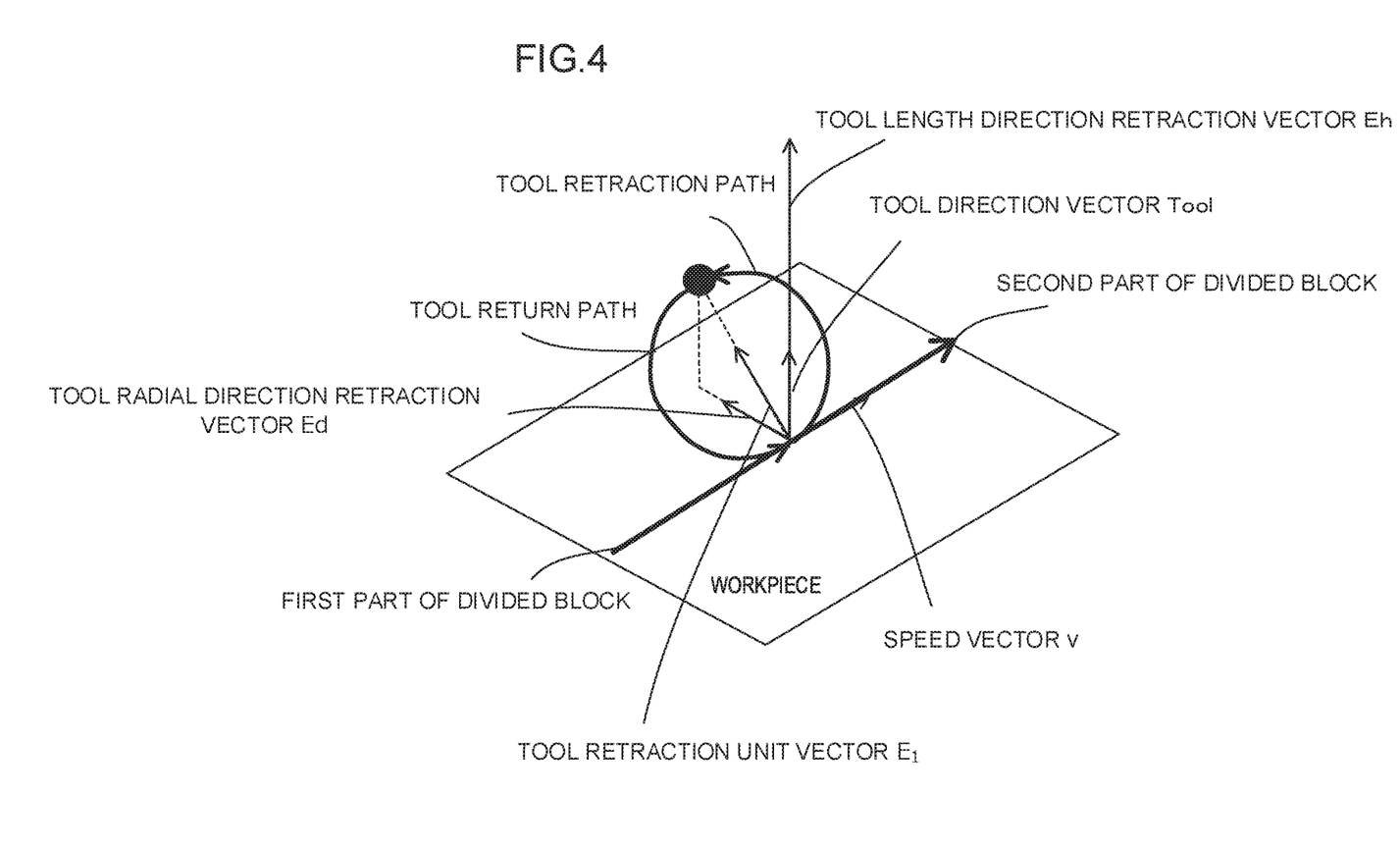
FIG. 4 is a diagram illustrating a method of generating an arc-shape tool retraction path and an arc-shape tool return path.
Figure 5:
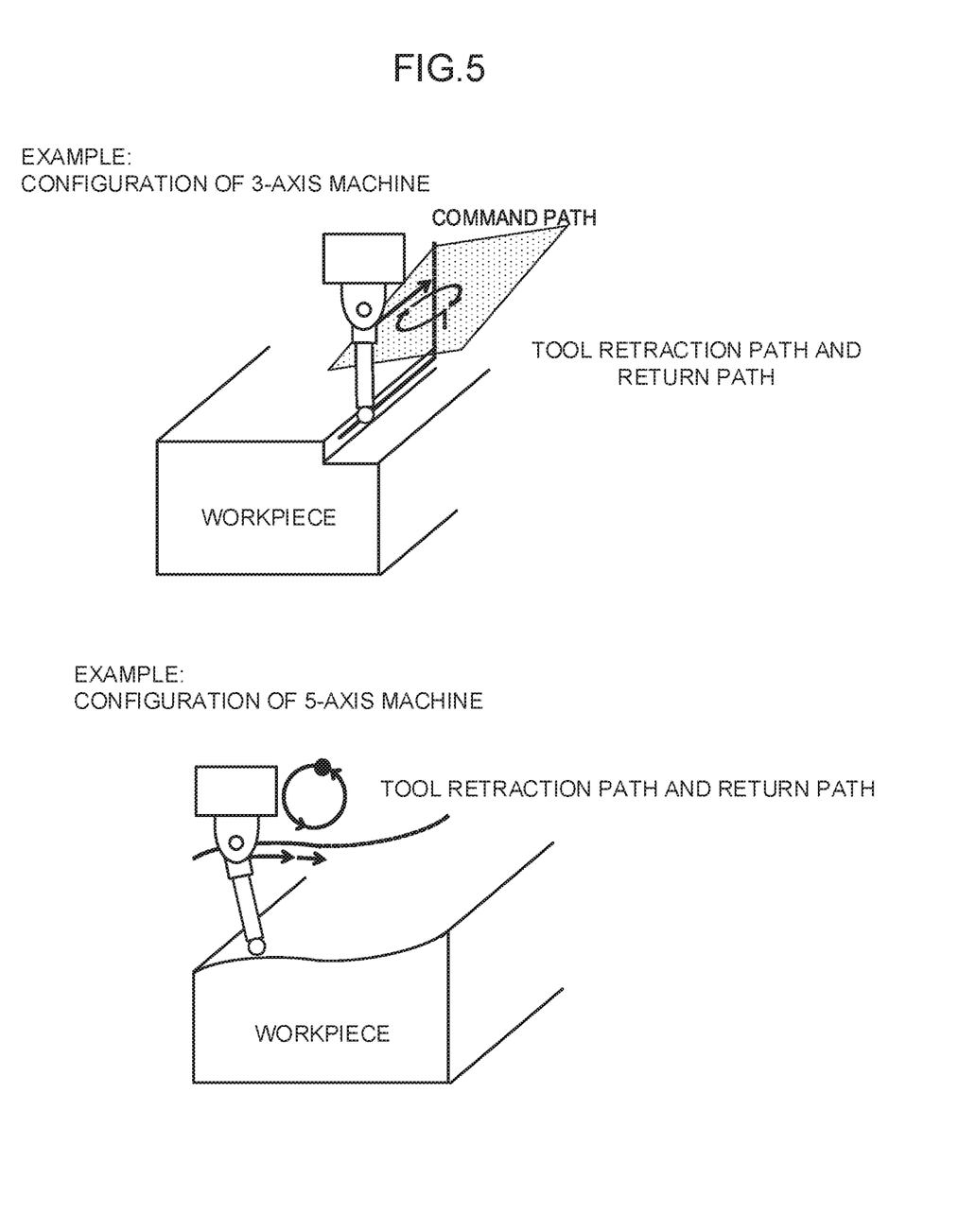
FIG. 5 is a diagram illustrating an example of a tool retraction path and a tool return path according to the present embodiment.

FIG. 4 illustrates a method by which the tool path generation unit 160 generates the tool retraction path and the tool return path each having an arc shape. For generating the tool retraction path and the tool return path each having an arc shape, the tool path generation unit 160 firstly calculates a tool direction vector Tool, which is a vector in a direction along an axis of the tool and retracting from the workpiece. Next, the tool path generation unit 160 calculates a cross product of the tool direction vector Tool and a speed vector v of the tool at the divided position of the block. When a modal information for a current machining indicates "offset to the left" (G41), the resultant cross product is a tool-radial-direction retraction vector Ed, which is a vector indicating a radial direction of the tool and retracting from the workpiece. Whereas, when a modal information indicates "offset to the right" (G42), a value of the resultant cross product multiplied by −1 is a tool-radial-direction retraction vector Ed. Furthermore, the tool path generation unit 160 calculates a tool-length-direction retraction vector perpendicular to a speed vector v in a plane containing a speed vector v and a tool direction vector Tool. (When an axial direction of the tool is tilted by a rotational axis as in a five-axis machine and the like, a tool direction vector Tool and a tool-length-direction retraction vector Eh may be different from each other.) The tool path generation unit 160 then calculates a tool retraction unit vector $E_1$ by adding a unit vector of the tool-radial-direction retraction vector Ed and a unit vector of the tool-length-direction retraction vector Eh. A vector obtained by multiplying the tool retraction unit vector $E_1$ by a predetermined tool retraction amount previously set is defined as a tool retraction vector E. Finally, the tool path generation unit 160 can generate a path that draws a 180-degree arc shape (a helical shape) about the calculated tool retraction vector E to generate a tool retraction path and a tool return path. As illustrated in FIG. 5, the tool retraction path and tool return path generated in this way retracts a tool from a workpiece at a gentle angle and returns the tool to the workpiece at a gentle angle, respectively, so as to prevent damage on the workpiece as much as possible in a machine tool with three linear axes and a five-axis machine tool with two rotational axes.

In the tool return determination unit 170, the CPU 11 of the numerical controller 1 shown in FIG. 1 executes the system program read from the ROM 12. In addition, the tool return determination unit 170 is implemented mainly by the CPU 11 performing arithmetic processing using the RAM 13 and the non-volatile memory 14. When commanded by the tool operation control unit 140 to return a tool from a state of the retraction before execution of a control commanded by the divided first part block, the tool return determination unit 170 discards the tool retraction path and the tool return path, outputting the divided second part block to the analysis unit 120. Whereas, when not commanded by the tool operation control unit 140 to return a tool from a state of the retraction before execution of the divided first part block, the tool return determination unit 170 outputs the tool retraction path to the analysis unit 120. Then, upon receiving a command to return a tool from a state of the retraction from the tool operation control unit 140, the tool return determination unit 170 outputs the tool return path and the divided second part block to the analysis unit 120.

The numerical controller 1 according to the present embodiment provided with the above configuration retracts a tool from a position apart from both ends of a block when retracting the tool from a workpiece, thereby being capable of minimizing a possibility for the tool retraction path and the tool return path to interfere with a machining path.

Figure 6:
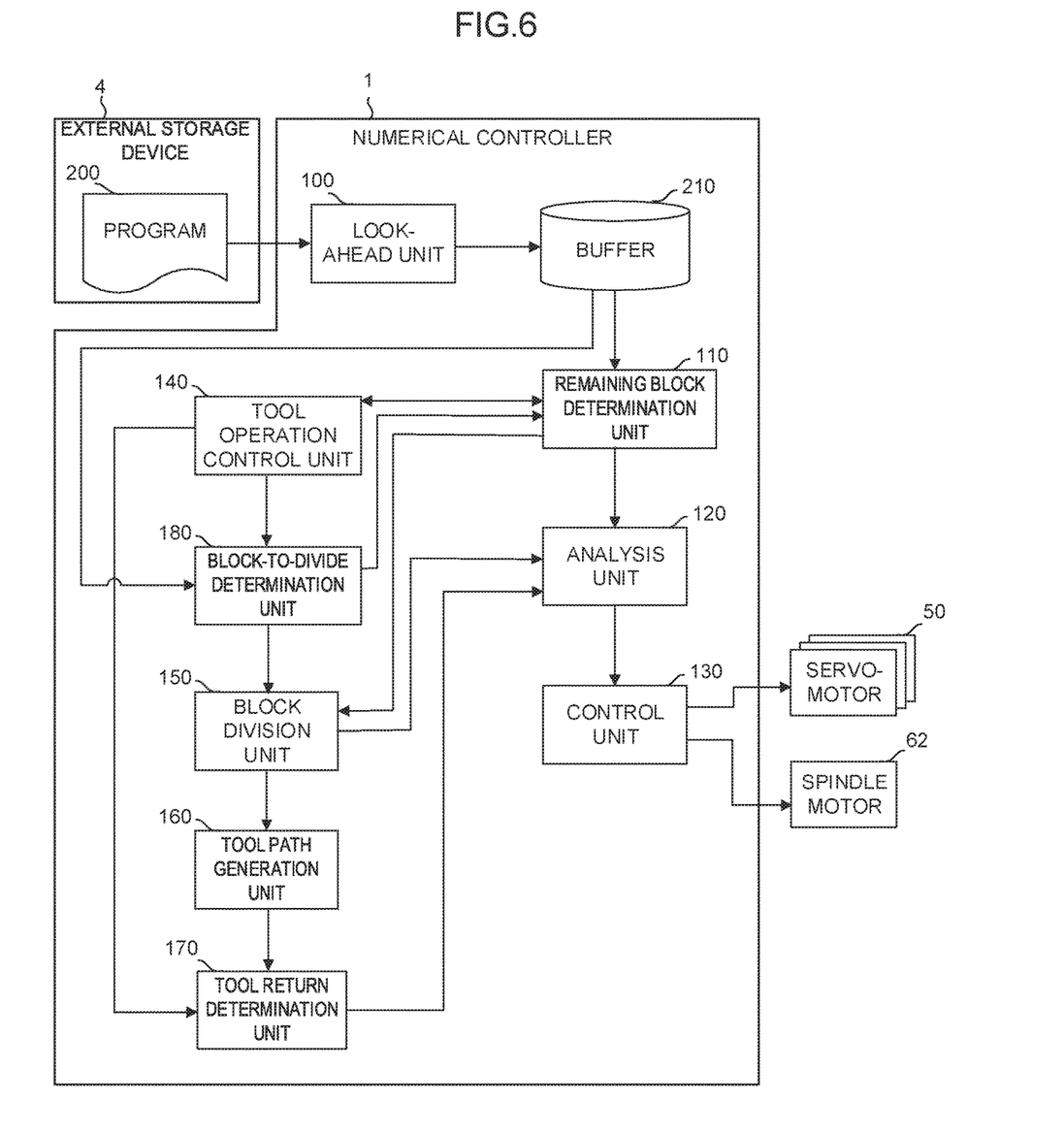
FIG. 6 is a schematic functional block diagram of a numerical controller according to a second embodiment.

FIG. 6 is a schematic functional block diagram of the numerical controller 1 according to the second embodiment of the present invention. In each functional block shown in FIG. 6, the CPU 11 of the numerical controller 1 shown in FIG. 1 executes the system program to control operation of each part of the numerical controller 1. The numerical controller 1 according to the present embodiment controls the servomotor 50 to relatively move a tool attached to the spindle and a workpiece, thereby controlling the machine tool that machines the workpiece using the tool rotating by the spindle motor 62.

The numerical controller 1 according to the present embodiment includes a look-ahead unit 100, a remaining block determination unit 110, an analysis unit 120, a control unit 130, a tool operation control unit 140, a block division unit 150, a tool path generation unit 160, a tool return determination unit 170, and a block-to-divide determination unit 180. Moreover, for the RAM 13 or the non-volatile memory 14 of the numerical controller 1, a buffer 210 is previously allocated as an area for buffering blocks in a program 200 looked ahead from the external storage device 4.

The look-ahead unit 100, the analysis unit 120, the control unit 130, the tool path generation unit 160, and the tool return determination unit 170 according to the present embodiment have the same functions as those of the look-ahead unit 100, the analysis unit 120, the control unit 130, the tool path generation unit 160, and the tool return determination unit 170 according to the first embodiment.

When determining that an amount of the remaining block is larger than a predetermined first threshold previously set or all the blocks in the program 200 is looked ahead into the buffer 210, the remaining block determination unit 110 reads a remaining block from the buffer 210 and outputs the block to the analysis unit 120. Alternatively, when determining that an amount of the remaining block is equal to or less than the predetermined first threshold previously set, the remaining block determination unit 110 notifies the tool operation control unit 140 of the determination. After that, when the block-to-divide determination unit 180 designates a block to divide for retraction and return of a tool, the remaining block determination unit 110 reads out up to the block right ahead of the block to divide to output the block to the analysis unit 120, then reading the block to divide to output the block to the block division unit 150. Then, the remaining block determination unit 110 temporarily stops reading a block from the buffer 210. The remaining block determination unit 110 monitors an amount of the remaining block in the buffer 210 while temporarily stopping reading the block. When determining that the amount of the remaining block looked ahead into the buffer 210 is equal to or more than a predetermined second threshold previously set, the remaining block determination unit 110 outputs the determination to the tool operation control unit 140 and restarts reading from the buffer.

When retraction of a tool is needed, the tool operation control unit 140 commands the block-to-divide determination unit 180 to determine a block to divide for tool retraction according to, for example, an input from the remaining block determination unit 110. Whereas, when return of a tool is possible, the tool operation control unit 140 commands the tool return determination unit 170 to return the tool from a state of the retraction according to, for example, an input from the remaining block determination unit 110. When notified from other than the remaining block determination unit 110, the tool operation control unit 140 commands the block-to-divide determination unit 180 to divide a current block when the notification commands retraction of the tool in the current block such as a feed hold signal and the like. Alternatively, when notified of no need to retract from the current block, the tool operation control unit 140 commands the block-to-divide determination unit 180 to determine a block to divide for retracting a tool.

In the block-to-divide determination unit 180, the CPU 11 of the numerical controller 1 shown in FIG. 1 executes the system program read from the ROM 12. In addition, the block-to-divide determination unit 180 performs arithmetic processing using the RAM 13 and the non-volatile memory 14 mainly by the CPU 11. When commanded from the tool operation control unit 140 to determine a block to divide for retracting a tool, the block-to-divide determination unit 180 refers to each block in the buffer 210 and determines a block to divide from the referred block. For example, when a non-cutting block is in the blocks looked ahead in the buffer 210, the block-to-divide determination unit 180 determines the non-cutting block as a block to divide. Alternatively, when a no-cutting block is not in the blocks looked ahead in the buffer 210, the block-to-divide determination unit 180 may determine the longest-path block in cutting blocks as a block to divide, for example. Here, when the tool operation control unit 140 has designated a block to divide, the block-to-divide determination unit 180 determines the designated block as a block to divide.

The block division unit 150 obtains the block designated as the block to divide from the remaining block determination unit 110 according to an input from the block-to-divide determination unit 180 to divide the block. The block division unit 150 then outputs a first part of the divided block to the analysis unit 120, outputting a second part of the divided block to the tool path generation unit 160. Other functions of the block division unit 150 are the same as those of the block division unit 150 according to the first embodiment.

The numerical controller 1 according to the present embodiment having the above configuration can select an appropriate block from blocks looked ahead into the current buffer 210 as a block for retracting a tool from the workpiece. Thus, it is possible to minimize a possibility for the tool retraction path and the tool return path to interfere with a machining path by retracting the tool from a position apart from both ends of a block.

While an embodiment of the present invention has been described herein, the invention is not limited to the above-described embodiment and may be suitably modified and embodied in various forms.

Figure 7:
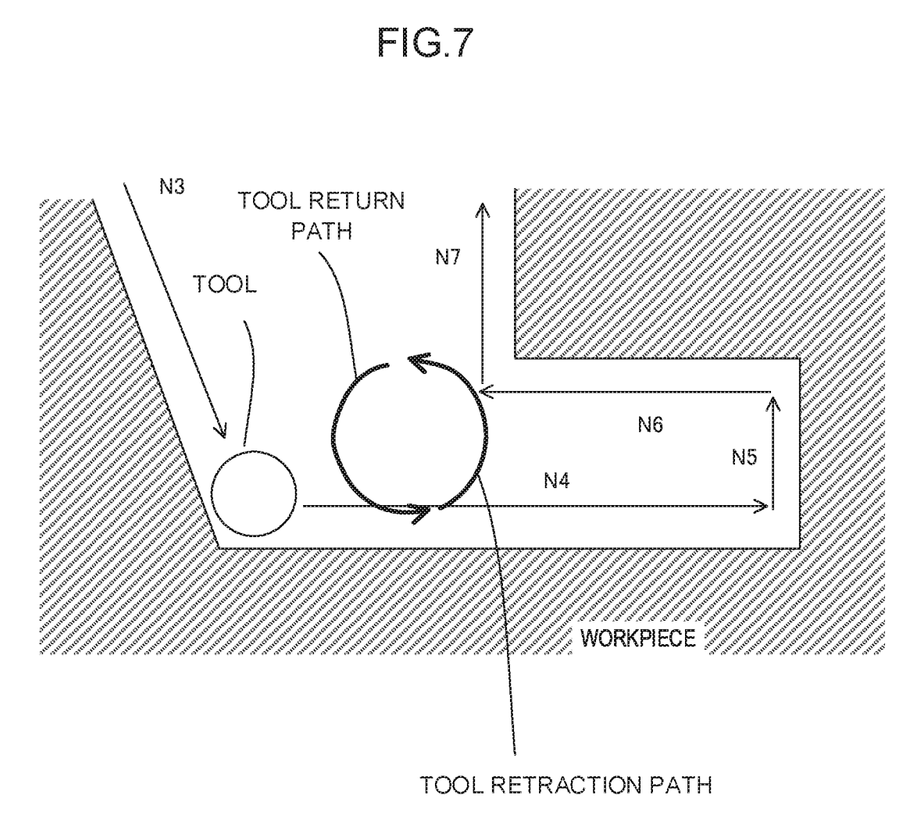
FIG. 7 is a diagram illustrating another embodiment of a block-to-divide determination unit and a block division unit.

In the above-described embodiment, for example, the block division unit 150 and the block-to-divide determination unit 180 determine a position at which a block is divided and a block to divide according to a predetermined rule. The block division unit 150 and the block-to-divide determination unit 180 may be configured to determine presence and absence of interference of a machining path with the tool retraction path and the tool return path and then determine a position at which a block is divided without the interference and a block to divide. As illustrated in FIG. 7, for example, when a need of a temporary stop of machining arises after execution of an N3 block in a program for moving a tool along a crank-shape path and machining, the block division unit 150 and the block-to-divide determination unit 180 place the tool retraction path and the tool return path on each of positions commanded by respective blocks looked ahead in the buffer, then determining whether the resultant tool retraction path and the resultant tool return path each overlap with other machining paths. Then, a block in which a machining path commanded by the block has no overlap with other machining paths even if the tool retraction path and the tool return path are placed onto the machining path may be determined as a block to divide, and in the block to divide, a position at which the machining path commanded by the block has no overlap with other machining paths even if the tool retraction path and the tool return path are placed onto the machining path may be determined as a dividing position. As an example in FIG. 7, suppose that an N4 block or an N7 block are blocks to divide, for the N4 block, a position closer to a forward end in the block may be determined as a dividing position.

Furthermore, although a tool retraction amount on retracting a tool is predetermined in the above-described embodiment, when a block division unit 150 retracts a tool from a position at which a block is divided, for example, a tool retraction amount may be calculated and used which has an adequate value in a range in which the tool can be sufficiently stopped without exceeding both ends of the block based on a distance from the division point of the block to the both ends of the block and the like.

The invention claimed is:

1. A numerical controller controlling a relative position between a tool of a machine tool and a workpiece to machine the workpiece according to a block in a program, the numerical controller comprising:
    a tool operation control unit configured to control retraction and return of the tool upon retraction of the tool being needed;
    a block division unit configured to divide a block to divide at a position apart from both ends of the block according to a command from the tool operation control unit; and
    a tool path generation unit configured to generate a tool retraction path and a tool return path and insert the generated paths into a divided position in the block divided by the block division unit.

2. The numerical controller according to claim 1, further comprising:
    a look-ahead unit configured to look ahead the block in the program into a buffer; and
    a remaining block determination unit configured to determine whether retraction of the tool is needed or return of the tool is needed based on an amount of the block looked ahead in the buffer,
    wherein the tool operation control unit controls retraction and return of the tool when the remaining block determination unit determines a need of retraction of the tool or a need of return of the tool.

3. The numerical controller according to claim 1, wherein the tool operation control unit controls retraction and return of the tool upon receiving a notification that commands retraction of the tool.

4. The numerical controller according to claim 1, wherein the tool path generation unit generates the tool retraction path for retracting the tool while keeping a feed speed in a cutting direction of the tool.

5. The numerical controller according to claim 1, wherein the tool path generation unit generates the tool return path for returning the tool while keeping a feed speed in a cutting direction of the tool at the same speed as a feed speed in the cutting direction during retraction.

6. The numerical controller according to claim 2, further comprising
    a block-to-divide determination unit configured to determine the block to divide for retraction and return of the tool from blocks looked ahead in the buffer.

* * * * *